United States Patent [19]

Venter et al.

[11] 3,852,477

[45] Dec. 3, 1974

[54] RECOVERING FLAVOR AND AROMA SUBSTANCES FROM FERMENTATION GASES

[76] Inventors: Peter Jacobus Venter, 5 Tortelduif Ave.; Johannes Daniel Malan, 5 Kronendal Ave., both of Stellenbosch, Cape, South Africa

[22] Filed: Nov. 16, 1973

[21] Appl. No.: 416,576

Related U.S. Application Data

[63] Continuation-in-part of Ser. No. 222,224, Jan. 31, 1972, abandoned, which is a continuation-in-part of Ser. No. 160,095, July 7, 1971, abandoned.

[52] U.S. Cl.............................. 426/15, 426/11, 426/16, 426/387
[51] Int. Cl............................ C12g 1/00, C12g 3/00
[58] Field of Search ........ 426/11, 15, 387, 369, 422

[56] References Cited

UNITED STATES PATENTS

| 2,536,994 | 1/1951 | Creznaschi............................ 426/15 |
| 2,859,117 | 11/1958 | Brans et al............................ 426/422 |
| 3,087,822 | 4/1963 | Smith et al............................ 426/387 |
| 3,526,509 | 9/1970 | Yamada et al......................... 426/369 |

*Primary Examiner*—David M. Naff
*Attorney, Agent, or Firm*—Young and Thompson

[57] ABSTRACT

In processes for making wine and beer the off-gases from the fermentation process are passed through activated carbon filters. The carbon is later on desorbed by mixing it into a small volume of the product wine or beer. This enriched volume is then used to enhance the flavour and aroma of a larger volume of wine or beer by suitable blending.

4 Claims, 1 Drawing Figure

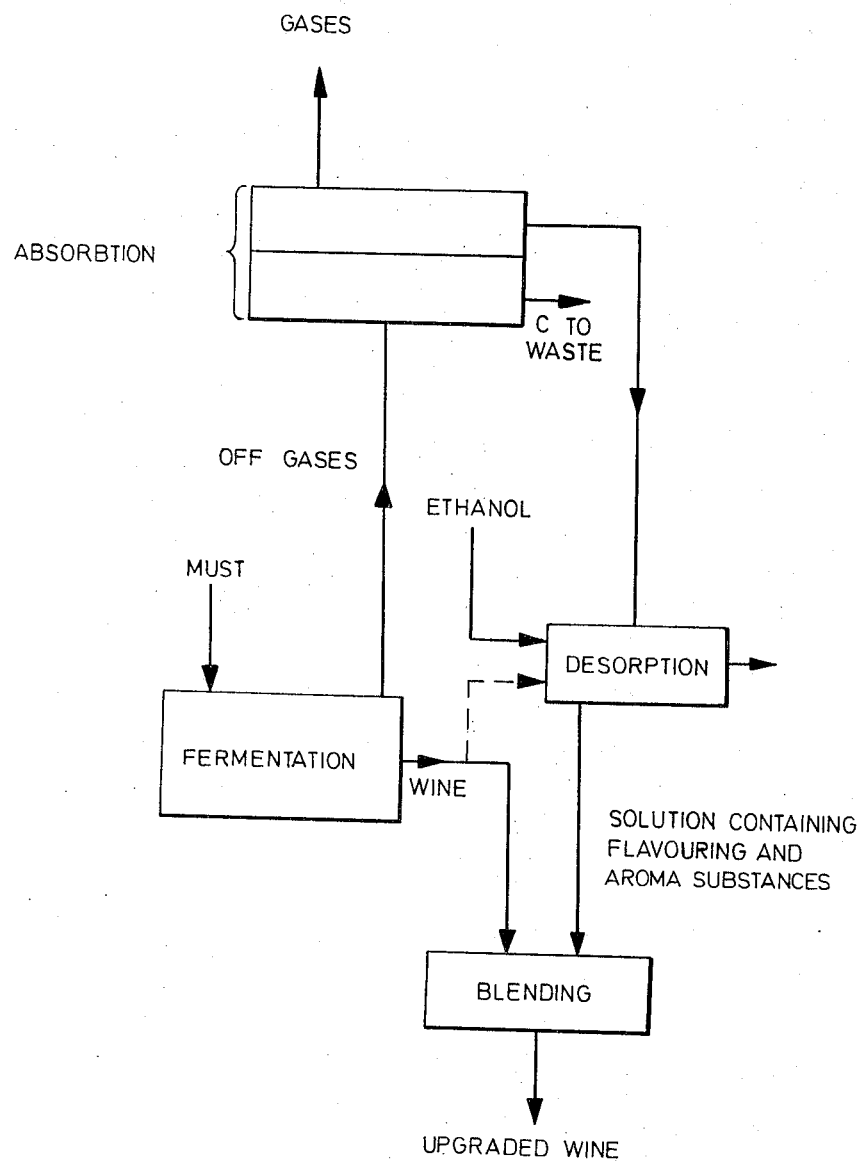

RECOVERING FLAVOR AND AROMA SUBSTANCES FROM FERMENTATION GASES

This application is a continuation-in-part of U.S. Pat. application Ser. No. 222,224 filed Jan. 31, 1972 now abandoned, which in turn was a continuation-in-part of U.S. Pat. application Ser. No. 160,095 filed July 7, 1971, now abandoned.

This invention relates to fermented beverages and particularly to products such as wines, beers, ciders, orange wines and like fermentation products.

Products of the kind in question are made by processes involving the fermentation with selected yeast cultures of a natural product such as grape must, apple juice, or a mash composed of a mixture of grains.

It has been appreciated by some that in processes of this kind some of the flavouring and aroma substances valued in the end product are lost in the off-gases of the fermentation process. In order to preserve these substances in wine making it is customary to ferment the best products of the vine at low temperatures and at slow rates. Nevertheless even under these conditions relatively large amounts of the flavouring and aroma substances are lost.

In U.S. Pat. No. 2,536,994 it has been proposed to recover some of the lost substances by compressing and condensing the off-gases. The condensed product is added back to the fermentation broth or is added to the finished product. Applicant is not aware that the process of this U.S. patent, in so far as it involves the recovery of lost flavours and aromas has met with any commercial success. Probably not all the desirable flavouring substances are recovered and in some cases undesirable substances end up in the final product.

A similar type of process is described in U.S. Pat. No. 3,526,509 in which flavouring components in a fermentation gas are captured by passing the gas through a solvent containing a flavour sustaining agent. It is not known what purpose the flavouring components thus captured are intended to serve. Once more there is no differentiation between desirable and undesirable substances.

In U.S. Pat. No. 2,859,117 flavour percursor substances in liquid beverages are absorbed by mixing activated carbon with the beverages. The substances are desorbed with ether and esterified to produce the flavouring substances. Absorption is in the liquid phase and there is no differentiation between substances.

In U.S. Pat. No. 3,087,822 so-called "essences" are removed from beverages and other solutions prior to heat treatment. First the solution is stripped of oxygen. Next the solution is heated and the heated solution treated with the same stripping gas to remove the essences. These are added back to the solution after heat treatment and cooling. The most important aspect appears to be that essence present be recovered and added back and that oxygen be excluded before the essences are added back.

Like U.S. Pat. Nos. 2,536,994 and 3,526,509 the present invention is concerned with the recovery of flavouring substances from the off-gases of a fermentation process without affecting that process in any way. It differs from the teachings of these two patents in important respects: the off-gases are first purified to remove hydrogen sulphide which is formed in relatively large quantities during especially wine fermentation, the flavouring and aroma substances are recovered from the gas phase on a bed of activated carbon and desorbed from the carbon for adding back to the same kind of beverage. Ethanol or the beverage itself is used for desorption.

The beverage thus produced has less objectionable hydrogen sulphide to affect its flavour than one that could be produced by the teachings of these two prior patents. Additionally it has been found, quite unexpectedly, that an artificial ageing process takes place on the activated carbon — probably esterification as performed in U.S. Pat. No. 2,859,117. In addition the process acts chromatographically so that substances such as water and carbon dioxide are displaced from the carbon bed by the heavier and more desirable flavouring and aroma substances.

The invention is further discussed below with reference to the following examples and the accompanying drawing of a flow sheet of a preferred embodiment.

EXAMPLE 1

In one example of the invention wine was produced from a raw material and in a process which would normally produce an inferior type of wine. The off-gases from the fermentation process were passed through a layer of activated carbon. At the completion of the fermentation process, wine was produced in the normal way. The activated carbon was desorbed by passing steam through the bed and condensing the steam. A wine taster pronounced the resulting liquid as having the same bouquet as wine. This small quantity of liquid was added to the wine that was produced and the product had all the flavour characteristics of a wine of much better quality than the inferior type that is normally produced by the process.

EXAMPLE 2

In another experiment the off-gases from the fermentation process of a wine intended for brandy distillation were collected on activated carbon for a number of days. The activated carbon was desorbed with steam and the collected watery liquid added to wine. The wine taster pronounced the wine as considerably better than the original sample.

It is believed that similar results can be obtained by desorption with an inert gas such as nitrogen (while heating) or a liquified inert gas such as nitrogen or carbon dioxide, vacuum distillation, or by ethanol vapour with the application of heat.

EXAMPLE 3

In still another experiment it has surprisingly been found that the activated carbon is effectively desorbed by mixing it with a small volume of wine. This small volume can then be blended to provide a wine with a suitable taste and nose. Still more surprisingly wine tasters have pronounced the wine of the invention as already aged. It therefore seems that in the process of adsorption and absorption some chemical change equivalent to ageing is produced. Probably a process of transesterification is involved and this process is catalysed by the activated carbon.

EXAMPLE 4

For wine production on a commercial scale the process which is illustrated in the accompanying drawing of a flowsheet has been developed.

In this process the grape must is fermented in a standard batch process. The off-gases were originally passed to a condenser such as tubes through which a coolant circulates. Condensed fluid was returned to the fermentation step. The return fluid also contained some alcohol. The main purpose of the condenser was to protect the activated carbon in the next step against moisture. However, it was found that this protection is not necessary.

The off-gases pass through a suitable absorption column loaded with activated carbon. As illustrated there are two layers: the bottom layers of the column are composed of an activated carbon which absorbs hydrogen sulphide and other sulphuretted compounds. The upper layer may be composed of the same activated carbon or a different one.

At the end of the absorption period the loaded carbon is transferred to a desorption vessel. In the embodiment illustrated in dotted lines it was gently stirred in wine at a temperature of about 60°C. After a suitable time, e.g., 1 hour, the wine was separated from the carbon, which is discarded and this volume of wine is then used for blending with very much large volumes of wine.

In one example according to the flow sheet the following results were obtained.

Volume of must subjected to fermentation: 18,000 litres.
Fermentation temperature: 15°C to 20°C.
Initial sugar content: 20°B
Initial weight of bed of activated carbon: 500 grams.

Maximum gas flow through bed: 15cm/m.
Duration of exposure to off-gases: The entire fermentation which lasts ± 10 days.
Final weight of activated carbon: 759 grams.
Weight of activated carbon discarded: 50 grams.
Weight of activated carbon desorbed: 709 grams.
Volume of wine used for desorption: 86 litres.
Volume of wine upgraded: 18,000 litres.
Comments of wine taster: Upgraded wine of much better quality than the original.

In the above described process removal of hydrogen sulphide is a most important step. According to P. Vos (an Msc. Thesis, Stellenbosch, 1966) an average of 1 mg $H_2S$ per litre of must is formed during fermentation. If this is added back it would increase the $H_2S$ concentration of the wine by this amount. According to Rankine (J Sci Fd Agric 14 79 (1963)) an average person can detect concentrations between 0,1 and 1 mg/l of the substance.

It is therefore essential that hydrogen sulphide should not be recovered from the off-gases and added back to the wine.

EXAMPLE 5

The process of example 4 was evaluated on a large number of experiments. In that example the activated carbon was eluted with wine. As a result of the laboratory experiments it was found that elution with ethanol gave the best product. As a result elution took place at 45°C by means of 96% ethanol. It was found that the flow rate of ethanol should be about 14,4 cm per hour.

Another improvement is that it was found that copper metal could replace the lower layer of activated carbon used for absorbing hydrogen sulphide. Later experiments showed that copper oxide was even better for this purpose.

Accordingly in this example the conditions and quantities were kept the same as in example 4 except that the lower 50 grams of activated carbon was replaced with copper metal cuttings and the upper bed contained 350 gm. In place of wine 2 litres of ethanol was used as described above to elute the activated carbon. Portions of the eluate were used to upgrade the wine that was made. An expert wine blender pronounced that the eluate was too rich for the purposes of upgrading the wine that had been produced. In other words, he had eluate over for upgrading other wines. Wine tasters pronounced the upgraded wine as excellent and even better than that of example 4.

It will be recalled that it was pointed out above that the condenser which was thought to be necessary in the path of the off-gases was no longer found to be necessary. It appears that there is a kind of chromatographic process involved and that water gets displaced up the column by the desired flavouring substances. Also high boiling point aroma substances displace those with lower boiling points. The length of the column should thus be so chosen that all the desired aroma substances are retained.

The 350 gm of carbon used in this experiment was housed in a container of 60 $cm^2$ and formed a layer 4 cm thick. It will be recalled that 18,000 litres of must was involved. For larger volumes of must, the bed diameter must be increased to keep the gas flow speed at or below 15 cm per second. The weight of carbon should also be increased proportionately.

Between 5°C and 65°C the temperature of the bed did not appear to be critical. In addition flow rates of above 15 cm per second of the gas up to 25 cm per second do not appear to have any detrimental effect. However, it is preferred to operate at or below 15 cm per second and to keep to normal wine fermentation temperatures.

EXAMPLE 6

A vessel in which a grain mash was fermenting for the manufacture of beer was connected to a condenser and an absorption column. The column was on line for the whole of the time that fermentation proceeded. The activated carbon was desorbed with ethanol and some of the resultant solution blended with small volumes of the beer that was produced. The comments of the brew master were that there was a distinct increase of flavour, but that he did not consider the product suitable to the tastes of his buying public.

It is believed that this example could be refined by a suitable choice of the period during which flavours are recovered and possibly also by discarding a portion of the bed of activated carbon. In this way a more subtle enhancement of flavour could be obtained.

EXAMPLE 7

In an experiment apple juice was fermented with a grape yeast culture. The off-gases were passed through a bed of activated carbon. Desorption was with ethanol. The ethanol solution had a strong cider flavour and led to the belief that the flavour of cider could be improved by making use of the processes of the invention.

EXAMPLE 8

Orange juice suitably diluted and with its sugar content brought up to 20°B was innoculated with a grape yeast culture and fermentation conducted. The off-gases were passed through activated carbon. The activated carbon was desorbed with ethanol fumes at 90°C. The resultant product had a disappointingly indistinct orangy flavour. It is believed that with larger volumes of orange juice and desorption at room temperature, a better product will be obtained. Thus it will be possible to enrich orange wine with the processes of the invention.

We claim:

1. A method of upgrading a beverage produced by a fermentation process from a base material including the steps of:
   a. fermenting the base material to produce an alcoholic beverage, and off-gases resulting from the fermentation process containing hydrogen sulphide and flavouring and aroma substances,
   b. passing the off-gases through a layer of material selected from the group consisting of activated carbon, copper metal particles and copper oxide, that absorbs hydrogen sulphide to purify the gases,
   c. passing the purified gases through a bed of activated carbon to load the carbon with flavouring and aroma substances,
   d. desorbing the flavouring and aroma substances on the carbon, and
   e. adding some of the desorbed flavouring and aroma substances to the beverage.

2. The method claimed in claim 1 in which the flavouring and aroma substances are desorbed with a small amount of the beverage.

3. The method claimed in claim 1 in which the flavouring and aroma substances are desorbed with ethanol.

4. A method of producing wine from a must including the steps of:
   a. fermenting the must to produce wine and off-gases containing hydrogen sulphide and flavouring and aroma substances,
   b. passing the off-gases through a layer of a material selected from the group consisting of activated carbon, copper metal particles and copper oxide, that absorbs hydrogen sulphide to purify the gases,
   c. passing the purified gases through a bed of activated carbon to load the carbon with flavouring and aroma substances,
   d. desorbing the flavouring and aroma substances on the carbon, and
   e. adding some of the desorbed flavouring and aroma substances to wine to produce a product wine.

* * * * *